United States Patent
Maurice et al.

(10) Patent No.: US 9,333,573 B2
(45) Date of Patent: May 10, 2016

(54) ICE SCREW SHARPENER

(71) Applicant: ZEDEL, Crolles (FR)

(72) Inventors: Alain Maurice, Saint Hilaire du Touvet (FR); Guillaume Bonnet, Grenoble (FR)

(73) Assignee: ZEDEL, Crolles (FR)

( * ) Notice: Subject to any disclaimer, the term of this patent is extended or adjusted under 35 U.S.C. 154(b) by 294 days.

(21) Appl. No.: 14/048,482

(22) Filed: Oct. 8, 2013

(65) Prior Publication Data

US 2014/0099169 A1   Apr. 10, 2014

(30) Foreign Application Priority Data

Oct. 9, 2012   (FR) ...................................... 12 02696

(51) Int. Cl.
| | |
|---|---|
| B23D 71/04 | (2006.01) |
| A63B 29/02 | (2006.01) |
| B24D 15/06 | (2006.01) |
| B24B 3/60 | (2006.01) |
| B23D 67/10 | (2006.01) |
| B23D 67/12 | (2006.01) |

(52) U.S. Cl.
CPC ................ B23D 71/04 (2013.01); B23D 67/10 (2013.01); B23D 67/12 (2013.01); B24B 3/60 (2013.01); B24D 15/06 (2013.01); *A63B 29/025* (2013.01); *Y10T 407/1825* (2015.01)

(58) Field of Classification Search
CPC ...... A63B 29/025; B23D 67/10; B23D 67/12; B23D 71/04; B24B 3/60; B24D 15/06; Y10T 407/1825
See application file for complete search history.

(56) References Cited

U.S. PATENT DOCUMENTS

| | | | | | |
|---|---|---|---|---|---|
| 2,485,123 | A | * | 10/1949 | West ....................... | B23B 51/00 175/18 |
| 3,786,876 | A | * | 1/1974 | Aaltonen ................ | E21B 7/008 175/18 |
| 4,064,665 | A | * | 12/1977 | Lowe .................... | A63B 29/025 175/18 |
| 5,782,442 | A | * | 7/1998 | Kwak .................. | A63B 29/027 248/231.9 |
| 6,502,649 | B1 | * | 1/2003 | Havel ...................... | E21B 10/44 175/18 |
| 7,507,149 | B1 | * | 3/2009 | Douglas .................. | B24B 3/247 451/321 |
| 2013/0136561 | A1 | * | 5/2013 | Maurice ............... | A63B 29/025 411/387.1 |

FOREIGN PATENT DOCUMENTS

SU        1 703 398 A1    1/1992

* cited by examiner

*Primary Examiner* — Joseph J Hail
*Assistant Examiner* — Marc Carlson
(74) *Attorney, Agent, or Firm* — Oliff PLC (57) ABSTRACT

A sharpener for an ice screw with a tubular shank and a bit, comprising:
   a fixed sharpening support equipped with a file in the form of an elongate blade,
   a positioning slide of the ice screw at predefined angles with respect to the file, said slide being able to move in translation astride the two opposite surfaces of the file,
   and guiding and stopping means of the bit in the slide comprising at least one opening for inserting the shank and a securing stud salient from the associated opening.

5 Claims, 8 Drawing Sheets

ICE SCREW SHARPENER

BACKGROUND OF THE INVENTION

The invention relates to a sharpening apparatus designed to sharpen the bit of a tubular ice screw.

Sharpening of an ice screw is very important to ensure that the latter can be easily screwed into the ice. The cutting face of the bit has to have a sharp cutting edge, and at the correct angle, and the clearance angle has to maintain an aggressive tooth tip for the bit to grip properly in the ice. These angles and edges become blunt with use, and the tip of the teeth can be damaged in case of contact with the rock.

STATE OF THE ART

Mountaineers usually sharpen their ice screws manually with a file, but it is difficult to keep the right angles to the detriment of the screwing and holding performance of the ice screw.

Electric sharpening machines generally equipped with abrasive wheels or strips also exist. These machines are used by professionals, for example to sharpen ski edges or cutting tools such as knives. Such machines are complicated and expensive, are not transportable in the field, and very few people are equipped with them.

OBJECT OF THE INVENTION

The object of the invention consists in providing a tubular ice screw sharpener that is able to be handled easily and enables the cutting angles of the bit and the performance of the ice screw to be preserved.

The sharpener according to the invention is characterized in that it comprises:
  a fixed sharpening support equipped with a file in the form of an elongate blade,
  a positioning slide of the ice screw at predefined angles with respect to the file, said slide being able to move in translation astride the two opposite surfaces of the file,
  and guiding and stopping means of the bit in the slide.

Such an apparatus is portable, is actuated manually, and is easy to handle for the user, enabling the cutting and/or clearance angles of the bit to be respected with precision.

According to a preferred embodiment, the guiding and stopping means comprise at least one opening for inserting the shank and a securing stud salient from said opening and oriented at a predefined angle. The stud is adjusted to the internal diameter of the shank to constitute an internal guiding and positioning means of the ice screw.

According to one feature of the invention, the slide comprises two openings for inserting the shank, said openings being situated on each side of the file, one being designed for sharpening the cutting face of the bit, and the other for sharpening of the flank.

The slide can also be arranged to only perform sharpening of the cutting face of the bit, but not that of the flank. In this case, the second opening of the slide is eliminated.

Preferably, the file extends in the vertical mid-plane of the support between two extensions and is provided with two serrated opposite lateral surfaces coming into contact with the teeth of the bit in a gap of the slide. Guiding of the slide in translation is performed by means of two grooves acting as slide rails for two ribs of the fixed support.

BRIEF DESCRIPTION OF THE DRAWINGS

Other advantages and features will become more clearly apparent from the following description of an embodiment of the invention given for non-restrictive example purposes only and represented in the appended drawings, in which.

DESCRIPTION OF A PARTICULAR EMBODIMENT

With reference to the figures, an ice screw sharpener 10 comprises a fixed sharpening support 11 on which a file 12 and a slide 13 for positioning an ice screw 14 are mounted. File 12 is formed by a straight blade extending in the vertical mid-plane between two extensions 15, 16 of the fixed sharpening support 11. The two opposite surfaces of file 12 are serrated so as to sharpen bit 17 of ice screw 14 when movement of slide 13 takes place in translation along file 12.

Figure 1:
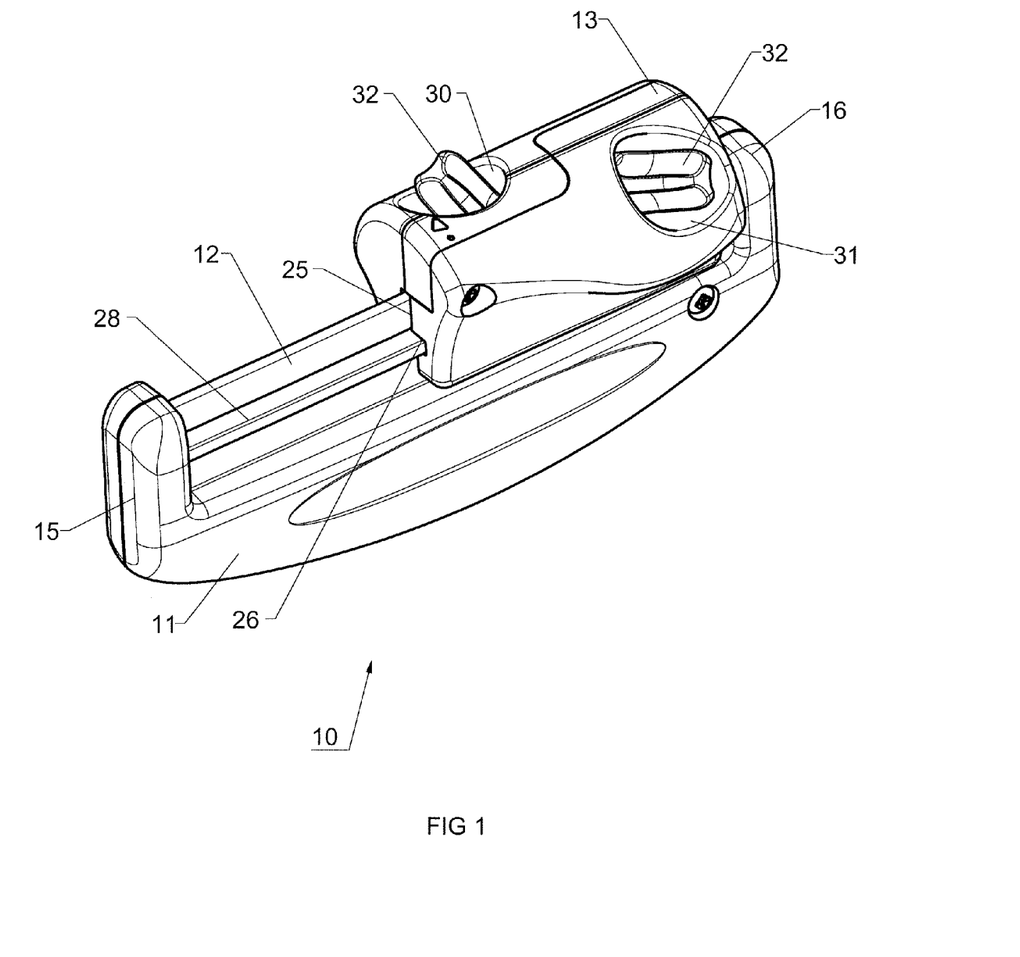
FIG. 1 is a perspective view of the sharpener according to the invention.
Figure 2:
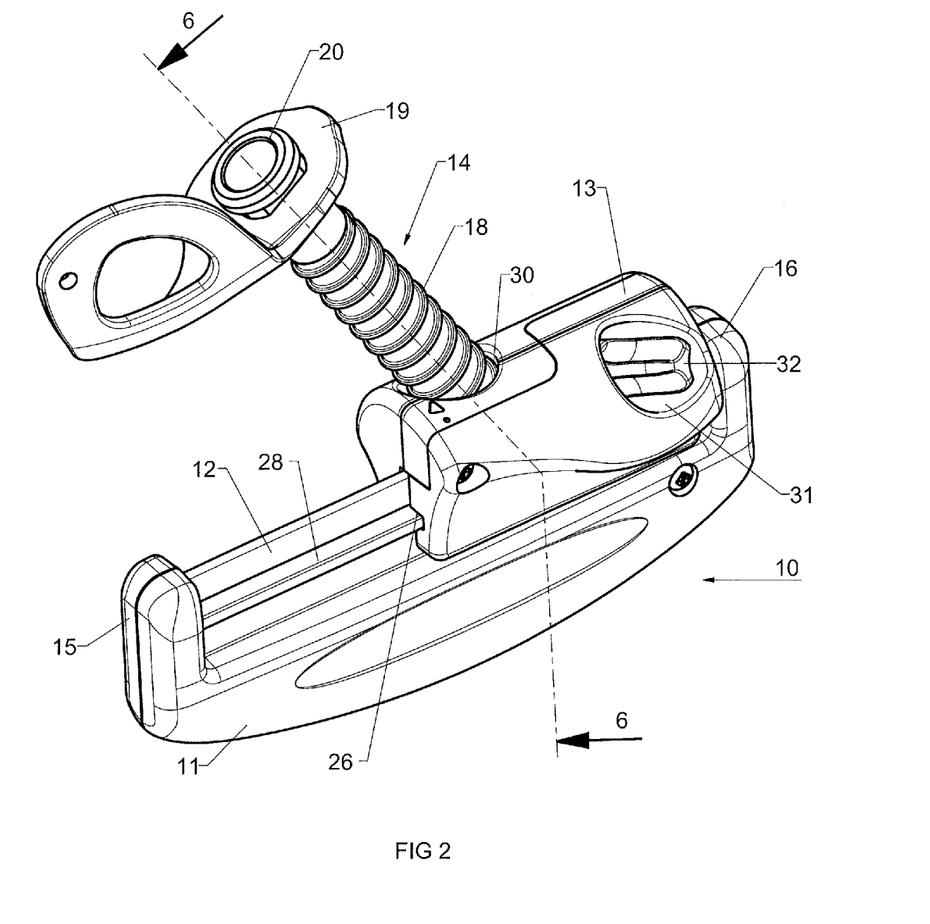
FIG. 2 shows the sharpener of FIG. 1, after an ice screw has been placed therein, which is positioned to sharpen the cutting face of the bit.
Figure 3:
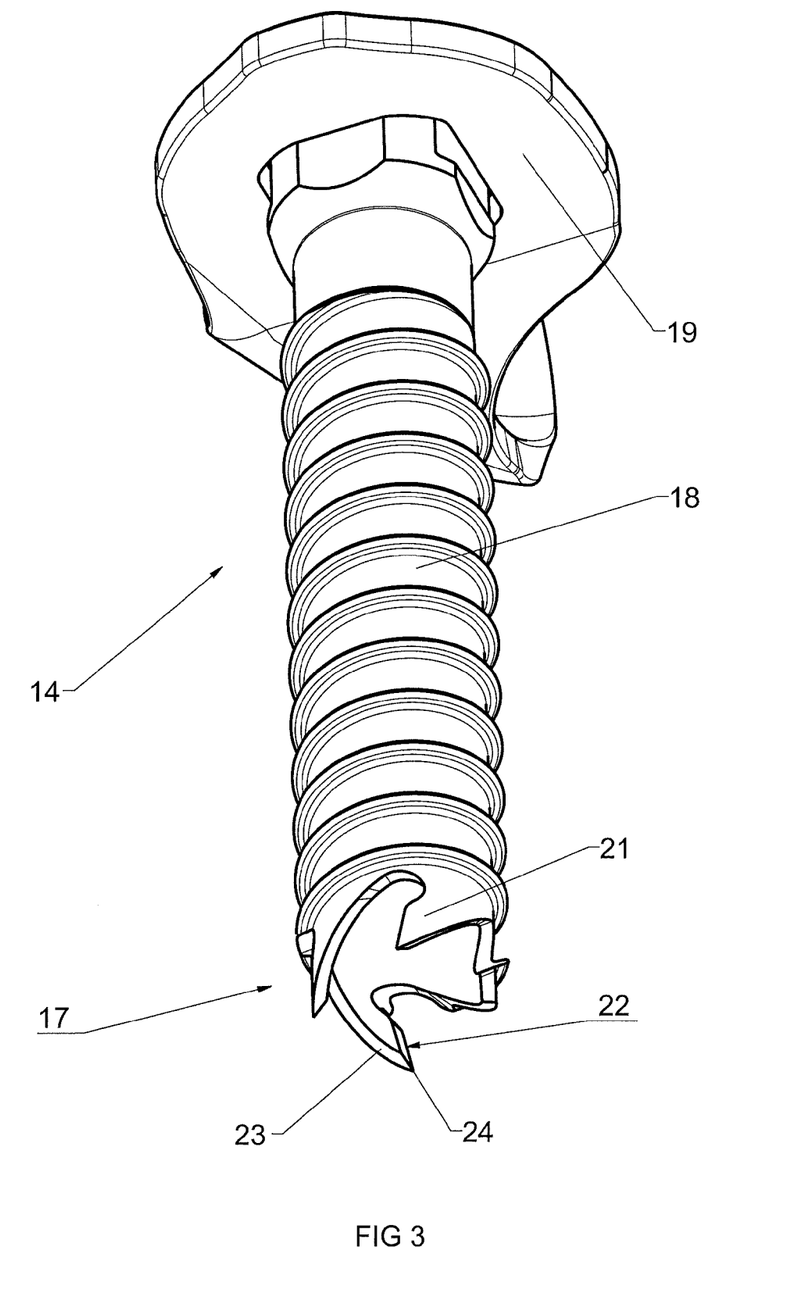
FIG. 3 represents a view of an ice screw known as such, and showing the bit with the structure of a tooth with its cutting face and its flank.
Figure 4:
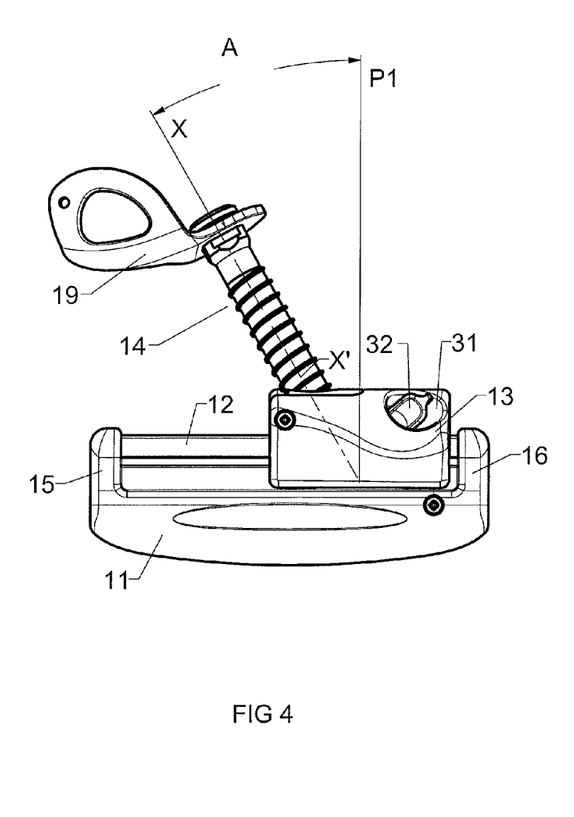
FIGS. 4 and 5 are elevational and side views of FIG. 2 with the different positioning angles of the ice screw 14.

Ice screw 14, in a well-known manner, comprises an externally threaded tubular shank 18 and a lug 19 for driving shank 18 in rotation for screwing into the ice. Lug 19 is fixed to the head 20 of shank 18, whereas bit 17 is located at the opposite end. Bit 17 is hollow like the shank and is formed by a series of teeth 21 arranged angularly at regular intervals around the longitudinal axis XX' of shank 18. In FIG. 3, each tooth 21 is provided with a cutting face 22 and with a flank 23 joined to one another by a tip 24. Cutting face 22 has to be sharp and at the right angle to facilitate screwing into the ice, and the angle of flank 23 has to be able to maintain an aggressive tip 24 to ensure precise biting into the ice.

Slide 13 comprises a vertical gap 25 straddling the two surfaces of file 12, and two horizontal grooves 26, 27 acting as slide rails for two ribs 28, 29 of fixed support 11. The two ribs 28, 29 are arranged horizontally on each side of file 12 so as to guide slide 13 with precision when bidirectional movement of the latter takes place in translation between the two extensions 15, 16. The thickness of gap 25 at the opposite ends of slide 13 is slightly greater than that of file 12.

Positioning of ice screw 14 on slide 13 is determined with precision to ensure sharpening of cutting face 22 and of flank 23. Slide 13 is equipped for this purpose with two openings 30, 31 for inserting bit 17 at a predefined angle. The two openings 30, 31 are located on each side of file 12 and each comprise guiding and stop means of bit 17. Left-side opening 30 in FIGS. 1 to 6 is designed for sharpening cutting face 22 of bit 17, whereas the other opening 31 is used to sharpen flank 23 (see FIGS. 7 to 10).

Guiding and stop means of bit 17 are formed for example by a securing stud 32 fixed inside the body of slide 13 and salient from each opening 30, 31. When ice screw 14 is fitted on slide 13, stud 32 passes through hollow bit 17 and a bottom part of shank 18 so as to perform guiding via the inside of the tube. The height of stud 32 is chosen to guarantee precise positioning of ice screw 14 when sharpening is performed. Stud 32 adjusts to the internal diameter of shank 18, which is substantially the same for all ice screws available on the market.

Figure 5:
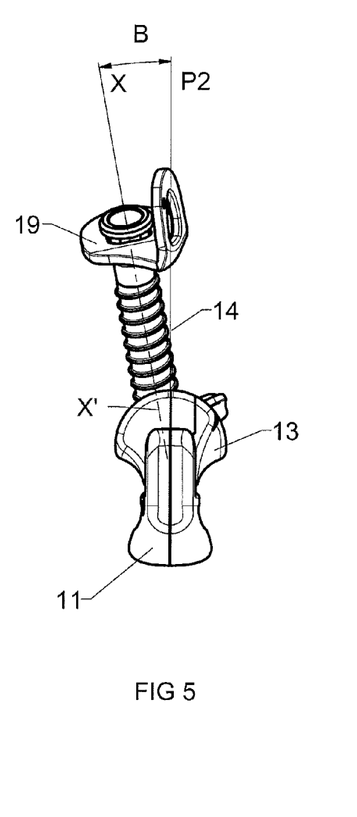
Figure 6:
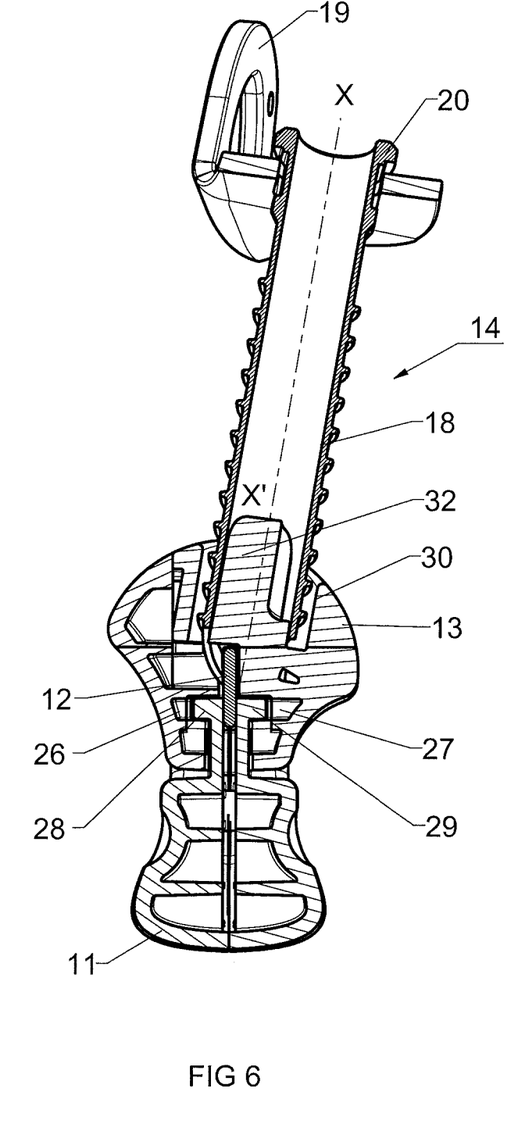
FIG. 6 is a cross-sectional view along the broken line 6-6 of FIG. 2.
Figure 7:
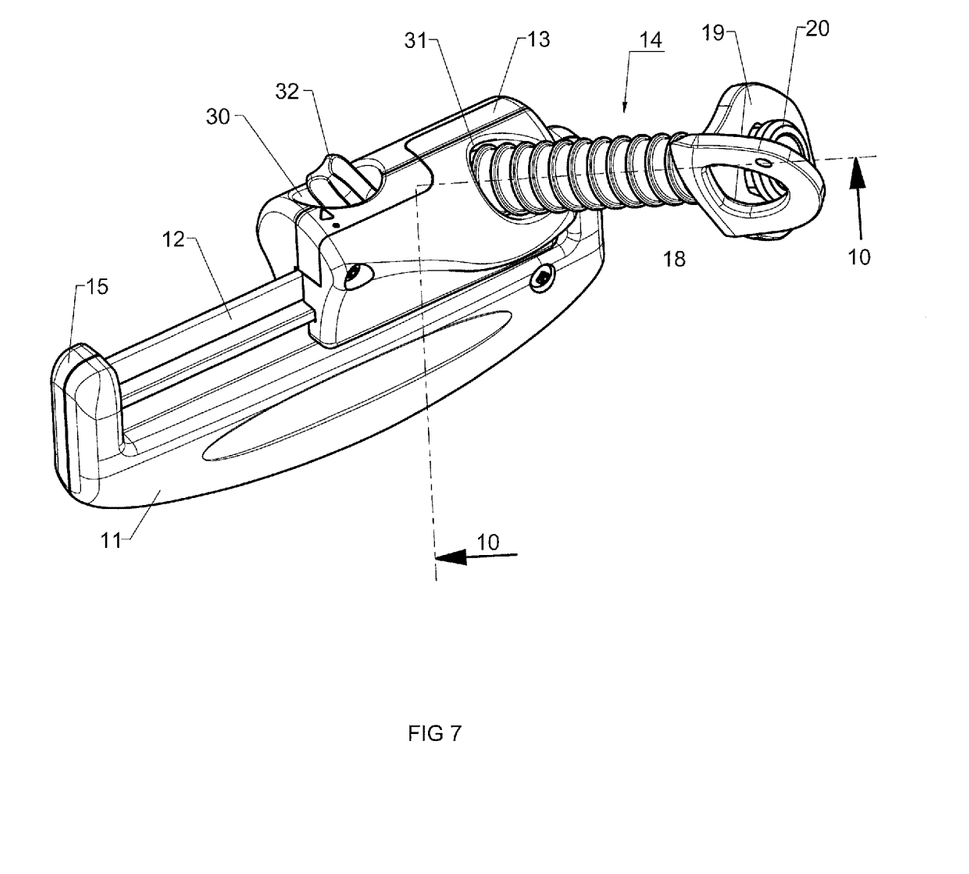
FIG. 7 shows the sharpener of FIG. 2 after the ice screw has been transferred into the other opening to sharpen the flank of the bit.
Figure 8:
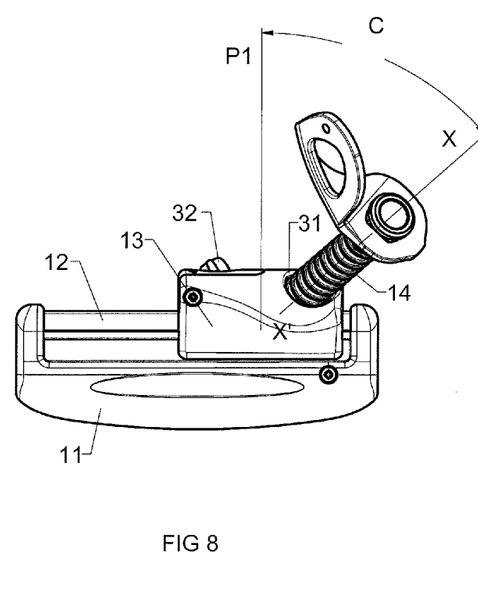
FIGS. 8 and 9 are elevational and side views of FIG. 7 with the different positioning angles of the ice screw 14.

For sharpening of cutting face 22 illustrated in FIGS. 2 to 6, the ice screw is inserted on stud 32 of opening 30. The axis XX' of shank 18 defines an angle A with a vertical plane P1 extending perpendicularly to file 12 (FIG. 4), and an angle B with the plane P2 of file 12 (FIG. 5). Cutting face 22 is then in contact with one of the surfaces of file 18. Slide 13 then simply has to be moved in translation, while at the same time keeping ice screw 14 at the bottom of opening 30.

Figure 9:
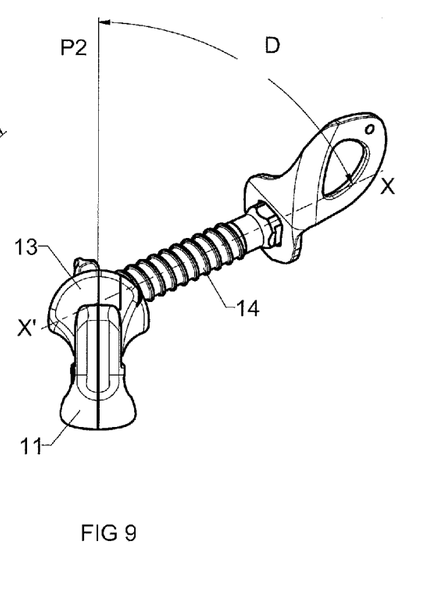
Figure 10:
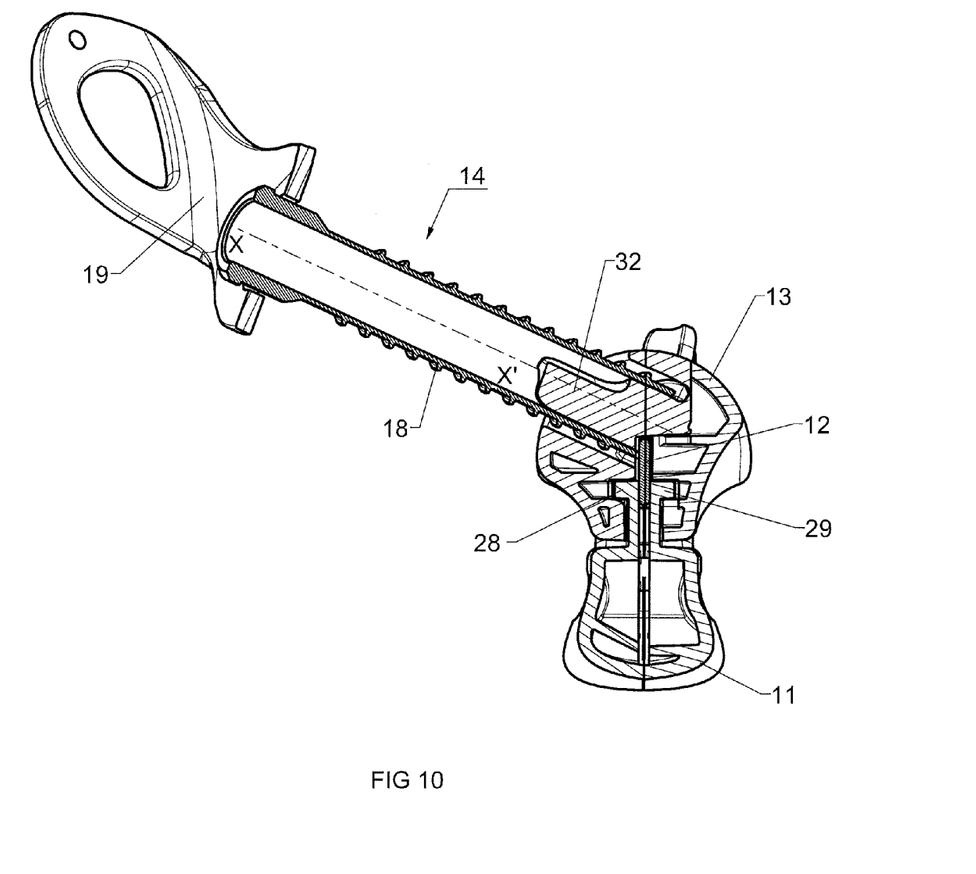
FIG. 10 is a cross-sectional view along the broken line 10-10 of FIG. 7.

For sharpening of flank 23 illustrated in FIGS. 7 to 10, the ice screw is inserted on stud 32 of the other opening 31. The axis XX' of shank 18 defines an angle C with a vertical plane P1 extending perpendicularly to file 12 (FIG. 8), and an angle D with the plane P2 passing through file 12 (FIG. 9). Flank 23 is then in contact with the other surface of file 18. Slide 13 then simply has to be moved in translation, while at the same time keeping ice screw 14 at the bottom of opening 31.

According to an alternative embodiment, slide 13 can be arranged to perform sharpening of cutting face 22 of bit 17, but not that of flank 23. In this case, second opening 31 of slide 13 is eliminated.

The invention claimed is:

1. A sharpener for an ice screw with a tubular shank and a bit that includes a plurality of teeth, said sharpener comprising:

a fixed sharpening support equipped with a sharpening element in the form of an elongate blade with two opposing substantially planar surfaces; and a positioning slide comprising two openings for inserting the tubular shank, each opening having centerline axes that enter the positioning slide on different sides of the substantially planar surfaces, one opening angularly oriented for sharpening a leading cutting face of a tooth of the bit, and the other opening angularly oriented for sharpening an angled flank face of the tooth of the bite at predefined angles with respect to the sharpening element, the slide being able to move in translation while aligned and guided by the fixed sharpening support astride the two opposite substantially planar surfaces of the sharpening element.

2. The sharpener according to claim 1, further comprising a securing stud salient from the two openings and oriented at a predefined angle.

3. The sharpener according to claim 2, wherein the securing stud is adjusted to an internal diameter of the tubular shank in order to internally guide and position the ice screw.

4. The sharpener according to claim 1, wherein the blade extends in a vertical mid-plane of the fixed sharpening support between two extensions.

5. The sharpener according to claim 4, wherein the fixed sharpening support includes ribs for guiding the positioning slide when the positioning slide moves in translation.

\* \* \* \* \*